US008172715B2

(12) United States Patent
Baldwin

(10) Patent No.: US 8,172,715 B2
(45) Date of Patent: May 8, 2012

(54) MULTIPLEXED GEAR ACTUATION SYSTEM FOR A DUAL CLUTCH TRANSMISSION

(75) Inventor: Reid Alan Baldwin, Howell, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 623 days.

(21) Appl. No.: 12/364,790

(22) Filed: Feb. 3, 2009

(65) Prior Publication Data

US 2010/0192718 A1 Aug. 5, 2010

(51) Int. Cl.
*F16H 3/44* (2006.01)
(52) U.S. Cl. .......................................................... 475/302
(58) Field of Classification Search .................... 74/329, 74/330, 331, 335, 473.12, 473.1
See application file for complete search history.

(56) References Cited

U.S. PATENT DOCUMENTS

| | | | |
|---|---|---|---|
| 5,966,989 A | 10/1999 | Reed, Jr. et al. | |
| 6,286,381 B1 * | 9/2001 | Reed et al. | 74/336 R |
| 6,334,371 B1 | 1/2002 | Stengel et al. | |
| 6,364,809 B1 | 4/2002 | Cherry | |
| 6,427,549 B1 | 8/2002 | Bowen | |
| 6,869,382 B2 * | 3/2005 | Leising et al. | 477/77 |
| 7,026,770 B2 | 4/2006 | Hemphill et al. | |
| 7,037,231 B2 | 5/2006 | Showalter | |
| 7,093,512 B2 | 8/2006 | Ibamoto et al. | |
| 7,150,698 B2 * | 12/2006 | Sakamoto et al. | 477/5 |
| 7,219,571 B2 | 5/2007 | McCrary | |
| 7,303,043 B2 | 12/2007 | Hemphill et al. | |
| 7,467,564 B2 * | 12/2008 | Baldwin et al. | 74/337.5 |
| 2004/0058774 A1 * | 3/2004 | Perkins et al. | 475/248 |
| 2005/0040783 A1 | 2/2005 | Hemphill et al. | |
| 2006/0079368 A1 | 4/2006 | Hemphill et al. | |
| 2006/0178242 A1 | 8/2006 | Showalter | |

* cited by examiner

*Primary Examiner* — David D Le
*Assistant Examiner* — David J Hlavka
(74) *Attorney, Agent, or Firm* — David B. Kelley; Brooks Kushman, P.C.

(57) ABSTRACT

A gear actuation mechanism for an automatic transmission, comprising: a motor; first and second gear actuation shafts; means of selecting one power path from each of two sets of power paths in response to rotation of the first and second actuation shafts, respectively; and means of alternately driveably connecting the motor to either the first gear actuation shaft or the second gear actuation shaft.

3 Claims, 5 Drawing Sheets

US 8,172,715 B2

MULTIPLEXED GEAR ACTUATION SYSTEM FOR A DUAL CLUTCH TRANSMISSION

BACKGROUND OF THE INVENTION

This invention is in the field of gear actuation mechanisms for automatic transmissions. The invention is particularly suited for gear actuation of dual clutch automatic transmissions.

In a dual clutch automatic transmission, it is necessary to select at most one even gear and at most one odd gear at any particular time. For maximum operational flexibility, it is desirable for the choices of odd gear and even gear to be independent. Typically, this is accomplished by providing two independent gear actuation mechanisms, including two motors. The motors and associated circuitry account for a substantial fraction of the costs of the actuation systems. Therefore, it is desirable to have one motor rather than two.

A well know actuation system uses a single motor to turn a single drum which actuates both even and odd gears. However, that system does not allow even and odd gears to be selected independently. For example, when sixth gear is selected, the only odd gears available would be fifth or seventh. Third gear cannot be selected, so a direct shift from sixth gear to third gear is impossible.

This invention uses a planetary gear set to multiplex a single motor, such that the motor is alternately connected to one of two independent drums. One drum actuates the odd gears and the other actuates the even gears. Although only one drum may be moved at a time, all positions on each drum are available independent of the position of the other drum.

Furthermore, the invention takes advantage of the relationship between the clutch state and the need to change gears to determine which of the two drums should be driven by the motor. Specifically, the odd gear is never changed while driving in an odd gear and the even gear is never changed while driving in an even gear. Therefore, the motor drives the even drum whenever the odd clutch is engaged and drives the odd drum whenever the even clutch is engaged.

DETAILED DESCRIPTION OF THE INVENTION

The present invention is an actuation system for a dual clutch transmission or transaxle. Before describing the actuation system in detail, the general structure and operation of a typical dual clutch transmission will be described.

Figure 6:
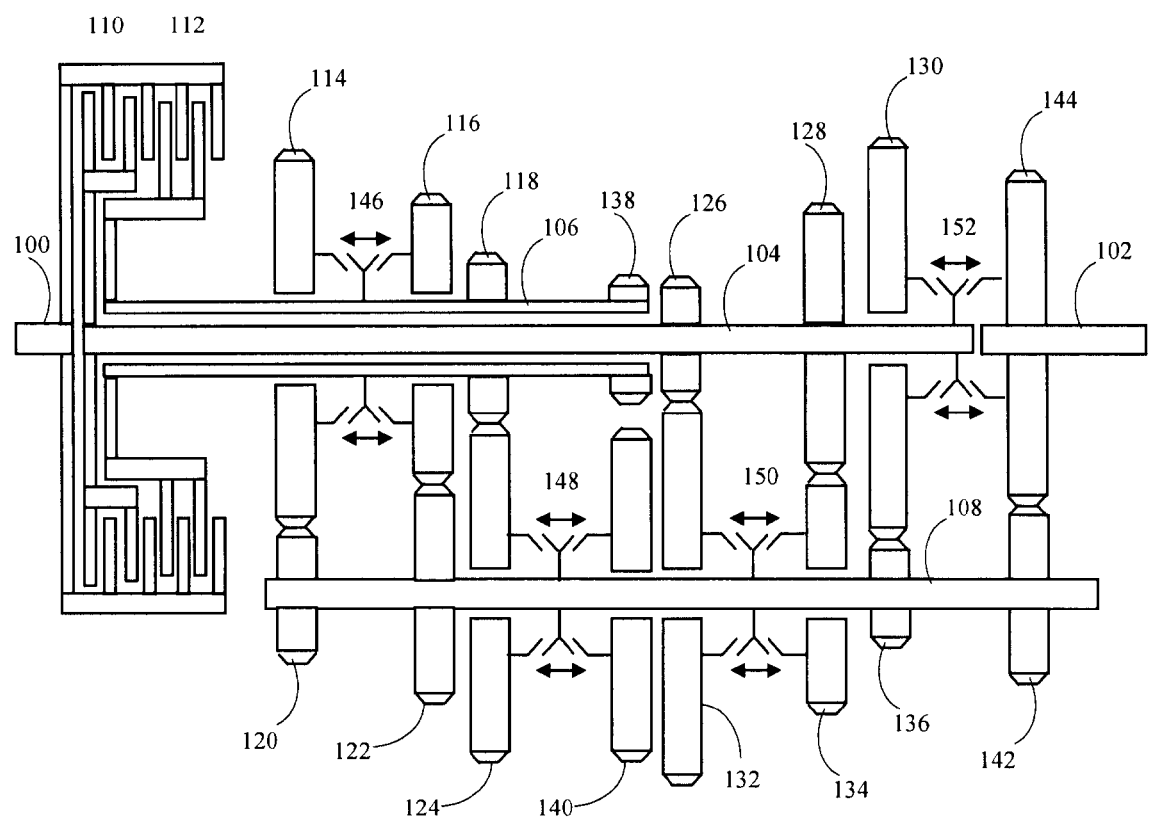
FIG. 6 is a schematic representation of a typical dual clutch transmission.

FIG. 6 illustrates the structure of a typical rear wheel drive dual clutch transmission. Front wheel drive dual clutch transaxles have similar structure and operation, except that the output shaft is on a different axis from the input shaft. In this document, the term "transmission" should be understood to include both rear wheel drive transmissions and transverse mounted transaxles. Input shaft 100 is driven by the vehicle engine. Output shaft 102 drives the vehicle wheels, preferably via a differential. Clutch 110 connects input shaft 100 to the odd gear intermediate shaft 104 whenever the clutch is applied and disconnects them whenever the clutch is disengaged. Similarly, clutch 112 connects input shaft 100 to the even gear intermediate shaft 106 whenever the clutch is applied and disconnects them whenever the clutch is disengaged. Even gear intermediate shaft 106 is a hollow shaft that is concentric with odd gear intermediate shaft 104.

Gears 126, 128, 130, 132, 134, and 136 provide several different selectable power paths between the odd gear intermediate shaft 104 and countershaft 108, each with a different speed ratio. One of the power paths is selected by moving synchronizers 150 and 152 to appropriate positions. To engage first gear, synchronizer 150 is moved leftward to couple gear 132 to shaft 108. To engage third gear, synchronizer 150 is moved rightward to couple gear 134 to shaft 108. To engage seventh gear, synchronizer 152 is moved leftward to couple gear 130 to shaft 104. Gears 142 and 144 provide a continuously engaged power path from countershaft 108 to output shaft 102. Moving synchronizer 152 to the right engages fifth gear, which is a direct drive gear, by coupling shaft 104 to output shaft 102. When both synchronizers 150 and 152 are in the neutral position, no power flows between shaft 104 and shaft 102 and no speed relationship is enforced.

Gears 114, 116, 118, 120, 122, and 124 provide several different selectable forward gear power paths between the even gear intermediate shaft 106 and countershaft 108, each with a different speed ratio. To engage second gear, synchronizer 148 is moved leftward to couple gear 124 to shaft 108. To engage fourth gear, synchronizer 146 is moved rightward to couple gear 116 to shaft 106. To engage sixth gear, synchronizer 146 is moved leftward to couple gear 114 to shaft 106. Gears 138, 140, and an idler gear which is not shown provide a selectable reverse gear power path from even gear input shaft 106 to countershaft 108. Moving synchronizer 148 to the right engages reverse by coupling gear 140 to shaft 108. When both synchronizers 146 and 148 are in the neutral position, no power flows between shaft 106 and shaft 102 and no speed relationship is enforced.

To prepare the vehicle for a launch from stationary in a forward direction, first gear is selected as described above and both clutches are set at zero torque capacity. In response to accelerator pedal movement, clutch 110 is gradually engaged. Launch in reverse is similar, except that reverse gear is selected and clutch 112 is gradually engaged.

Whenever the vehicle is moving in an odd numbered gear, clutch 110 will be engaged and power will flow via one of the odd power paths to the output shaft. Clutch 112 will be disengaged and no power flows through any of the even power paths. To prepare for a shift into an even numbered gear, synchronizers 146 and 148 are positioned to select the desired gear as described above. Then, clutch 112 is gradually engaged while clutch 110 is gradually disengaged, transferring the power flow to the even gear power path. Similarly, a shift from an even gear to an odd gear is accomplished by selecting the odd gear while all power flows through an even power path and then gradually engaging clutch 110 while gradually disengaging clutch 112.

Figure 1:
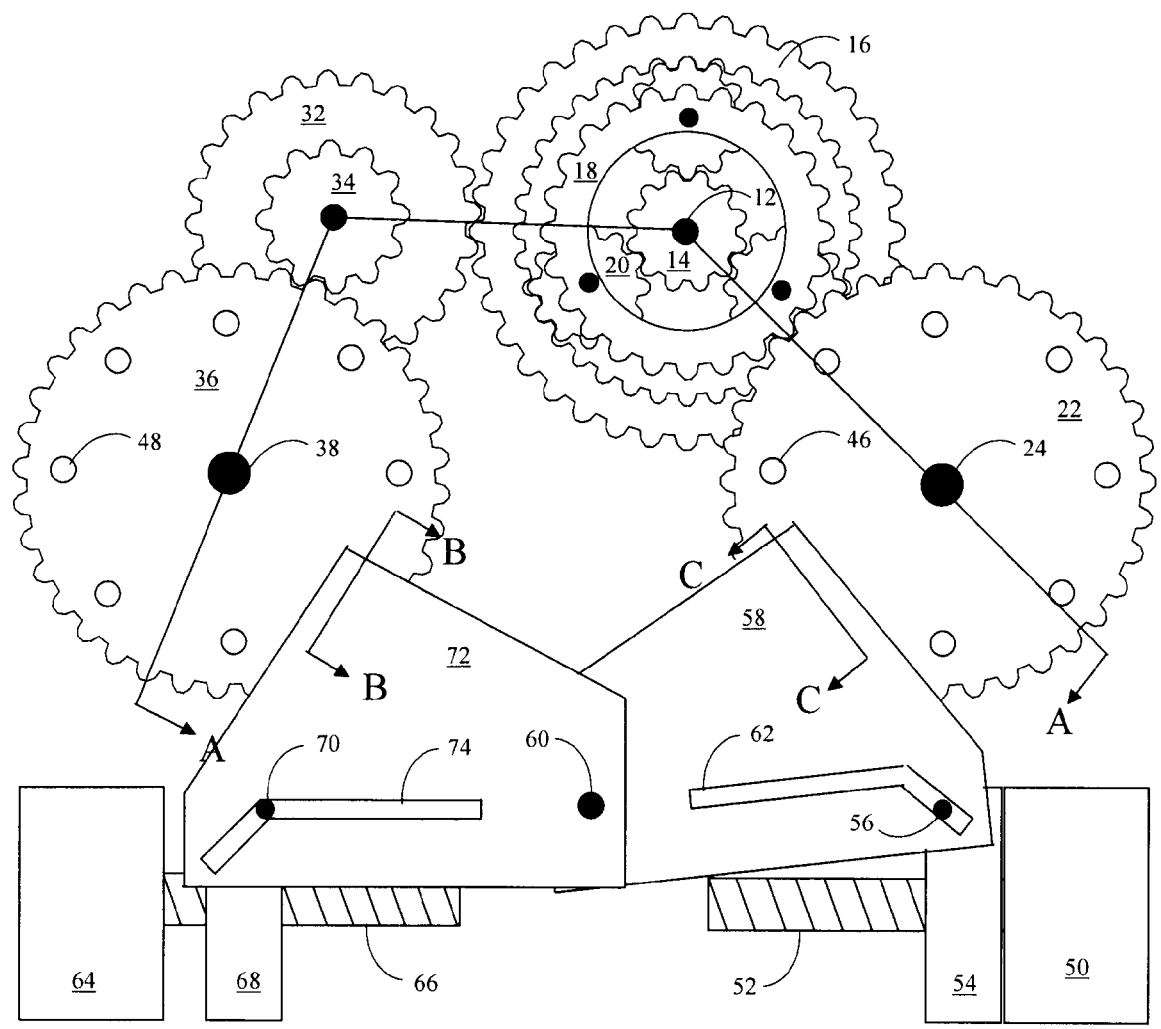
FIG. 1 is an end view of a first embodiment of the gear actuation mechanism.
Figure 2:
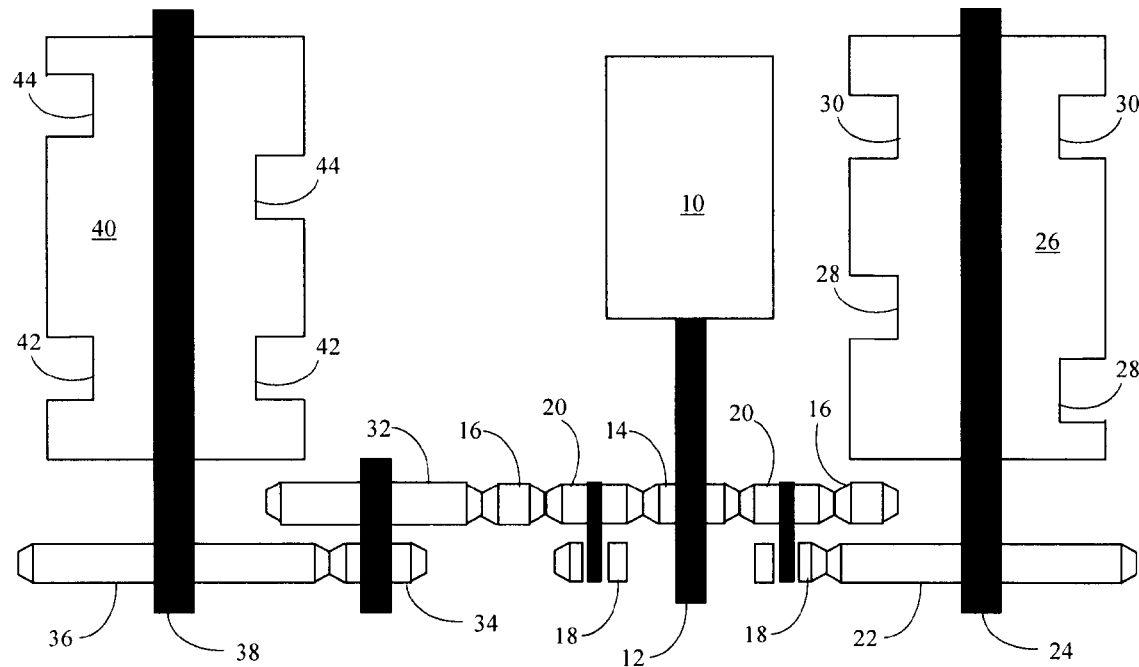
FIG. 2 is a sectional view through section A-A in FIG. 1.

The present invention provides a mechanism for adjusting the positions of synchronizers or other couplers to engage the desired power paths. FIG. 1 is an end view of a first embodiment of the gear actuation mechanism. FIG. 2 is a sectional view through section A-A in FIG. 1. A planetary gear set includes a sun gear 14, a ring gear 16, a planet carrier 18, and a set of planet gears 20. The planet gears are supported for rotation by the planet carrier and mesh with the sun gear and ring gear. The sun gear and planet gears each have 12 external teeth and the ring gear has 36 internal teeth. A gear actuator motor 10 drives sun gear 14 via shaft 12. Carrier 18 has 24 external teeth which mesh with the 36 external gear teeth of gear 22. When ring gear 16 is held stationary, each revolution of motor 10 results in ¼ revolution of carrier 18 and ⅙ revolution of gear 22.

Gear 22 is connected to the even actuator drum 26 by actuation shaft 24. Even actuator drum 26 has two grooves 28 and 30 with the axial location of the grooves varying along the circumference of the drum. A fork (not shown) extends into groove 28 and positions synchronizer 146. Another fork extends into groove 30 and positions synchronizer 148. The rotational position of the drum determines the positions of the forks and synchronizers. The axial location of each groove around the circumference is selected such that particular positions of the drum correspond to each desired odd gear state.

Ring gear 16 has 36 external teeth which mesh with the 24 gear teeth of gear 32. Gear 32 is connected to gear 34 which has 12 teeth. Gear 34 meshes with gear 36 which has 36 teeth. When carrier 18 is held stationary, each revolution of motor 10 results in ⅓ revolution of ring gear 16, ½ revolution of gears 32 and 34, and ⅙ revolution of gear 36. Gear 36 is connected by actuation shaft 38 to odd actuator drum 40. Drum 40 has two grooves, 42 and 44, which guide forks that determine the positions of synchronizers 150 and 152.

The remainder of the mechanism functions to hold either ring gear 16 or planet carrier 18 stationary. Motor 10 may then be used to adjust the position of either drum 26 or drum 40, depending upon which element is held. In a first embodiment, the selection of which element to hold stationary is determined by the states of the clutches.

Motor 64 drives shaft 66 which moves trolley 68 left or right. Translation of trolley 68 adjusts the torque capacity of clutch 110 through a mechanism which is not illustrated. Examples of such a mechanisms can be found in U.S. Pat. Nos. 6,679,362 and 7,073,649. The torque capacity is zero at the position shown and increases as the trolley is moved to the right. There is some additional travel available to the left of this position which is used to select which drum will be rotated by motor 10. Similarly, motor 50 drives shaft 52 which moves trolley 54 left or right. Trolley 54 is shown at the rightmost limit of its travel. As it is moved to the left, the first portion of its travel is used to select which drum will be rotated by motor 10 and the remainder or the travel is used to control the torque capacity of clutch 112.

Linkages 72 and 58 are supported for rotation about pin 60. Pin 70 attached to trolley 68 engages groove 74 causing linkage 72 to rotate about pin 60 as the trolley is moved. Similarly, pin 56 engages groove 62 causing linkage 58 to rotate as trolley 54 moves. Grooves 74 and 62 are L-shaped such that the movement of the linkages occurs while the trolleys move through the first portion of their travel and the linkages are stationary during the torque capacity adjustment portion of the travel.

Figure 3:
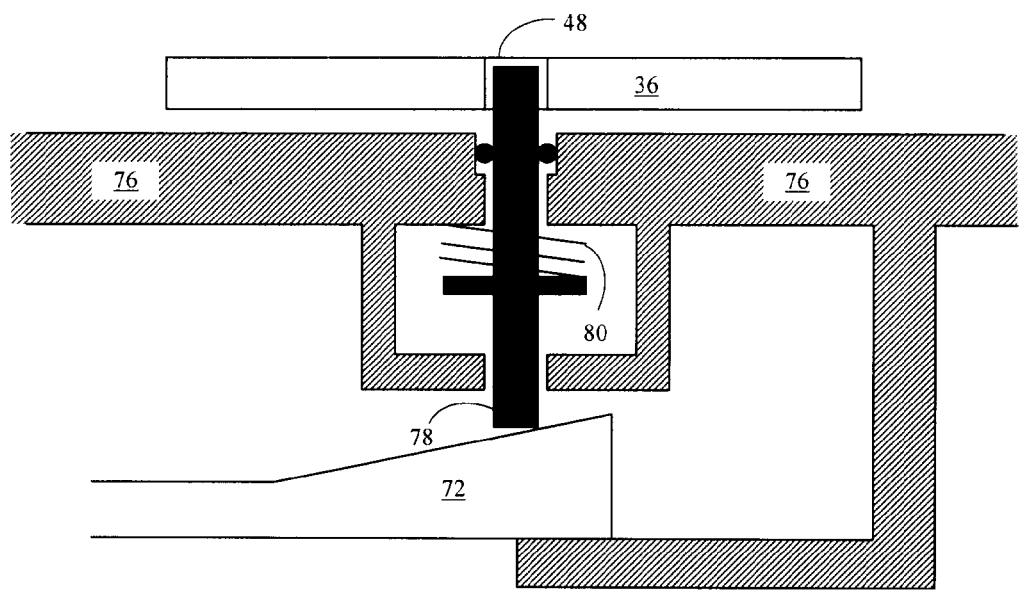
FIG. 3 is a sectional view through section B-B in FIG. 1.
Figure 4:
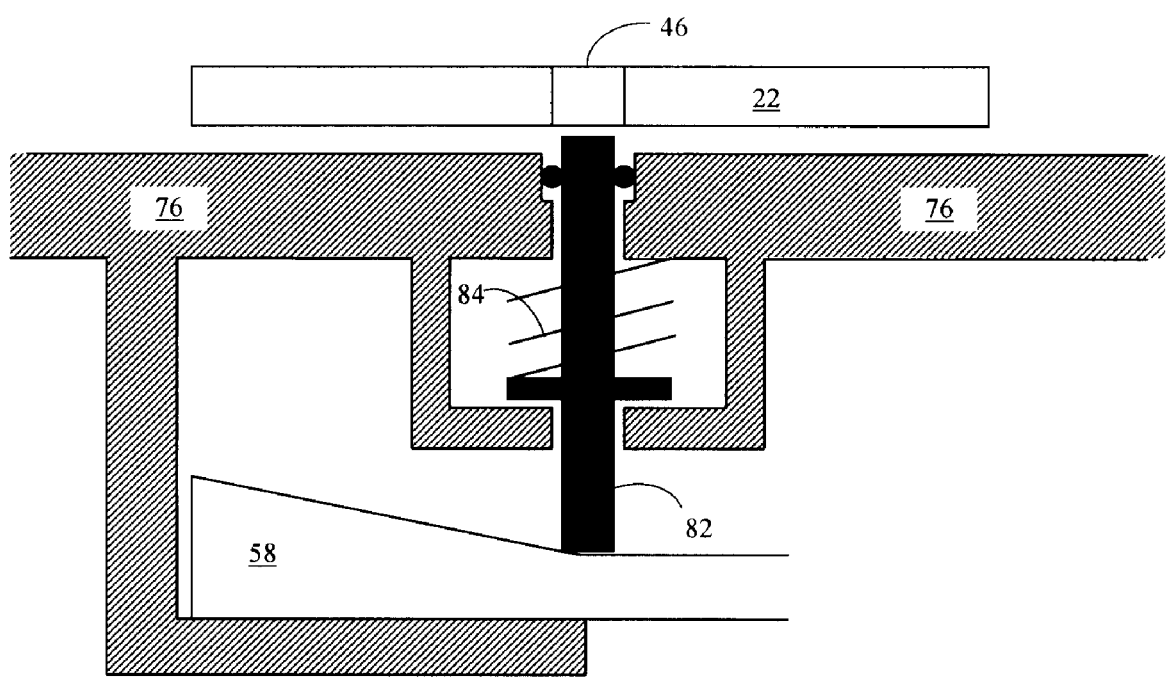
FIG. 4 is a sectional view through section C-C in FIG. 1.

FIGS. 3 and 4 are sectional views through sections B-B and C-C in FIG. 1, respectively. Pins 78 and 82 are supported by the transmission case 76. When trolley 68 is in the torque capacity adjustment portion of its travel, linkage 72 moves to the position illustrated in FIG. 3. An inclined surface on linkage 72 pushes pin 78 into one of a set of holes 48 in gear 36. These holes 48 are positioned to correspond to desired odd gear states such as first, third, fifth, seventh, and neutral. When trolley 68 is moved to the leftmost stop, linkage 72 rotates such that pin 78 is pushed out of the hole by spring 80, allowing gear 36 to rotate. Similarly, when trolley 54 is at the rightmost position of its travel, linkage 58 moves to the position shown in FIG. 4. In this position, the linkage allows spring 84 to push pin 82 away from gear 22. Whenever trolley 54 is moved into the torque capacity adjusting portion of its travel, the inclined surface on linkage 58 pushes pin 82 into one of a set of holes 46 in gear 22. These holes correspond to desired even gear states second, fourth, sixth, reverse, and neutral. An added feature of this mechanism is that the clutch is mechanically precluded from engaging whenever the corresponding drum is not in a position associated with a well defined gear state.

A skilled mechanism designer would be able to create a number of alternate mechanical linkages between the clutch actuators and the gear actuation shafts to satisfy the function of holding the gear actuation shaft stationary whenever the corresponding clutch is applied. Any such mechanism should be considered an equivalent to the corresponding mechanism described above.

To prepare the transmission for a forward launch, motor 64 is engaged to move trolley 68 all the way to the left stop and motor 50 is engaged to move trolley 54 to the beginning of the torque capacity adjustment portion of its travel. In this configuration, gear 22 and planet carrier 18 are held stationary. Then, motor 10 is engaged to rotate drum 40 to the position corresponding to first gear. Once thus configured, motor 64 is used to adjust the torque capacity of clutch 110 in response to the accelerator pedal position.

When the vehicle is driving in an odd gear, the transmission is prepared for a shift into an even gear by engaging motor 50 to position trolley 54 at its stop. In this configuration, gears 36, 34, 32, and ring gear 16 are held stationary. Motor 10 is then engaged to move drum 22 to the position corresponding to the desired even gear. To complete the shift, motors 50 and 64 are used in a coordinated fashion to gradually increase the torque capacity of clutch 112 while decreasing the torque capacity of clutch 110. Similarly, to prepare for a shift into an odd numbered gear, trolley 68 is moved all the way to the left stop and then motor 10 is engaged to select the desired odd gear.

Figure 5:
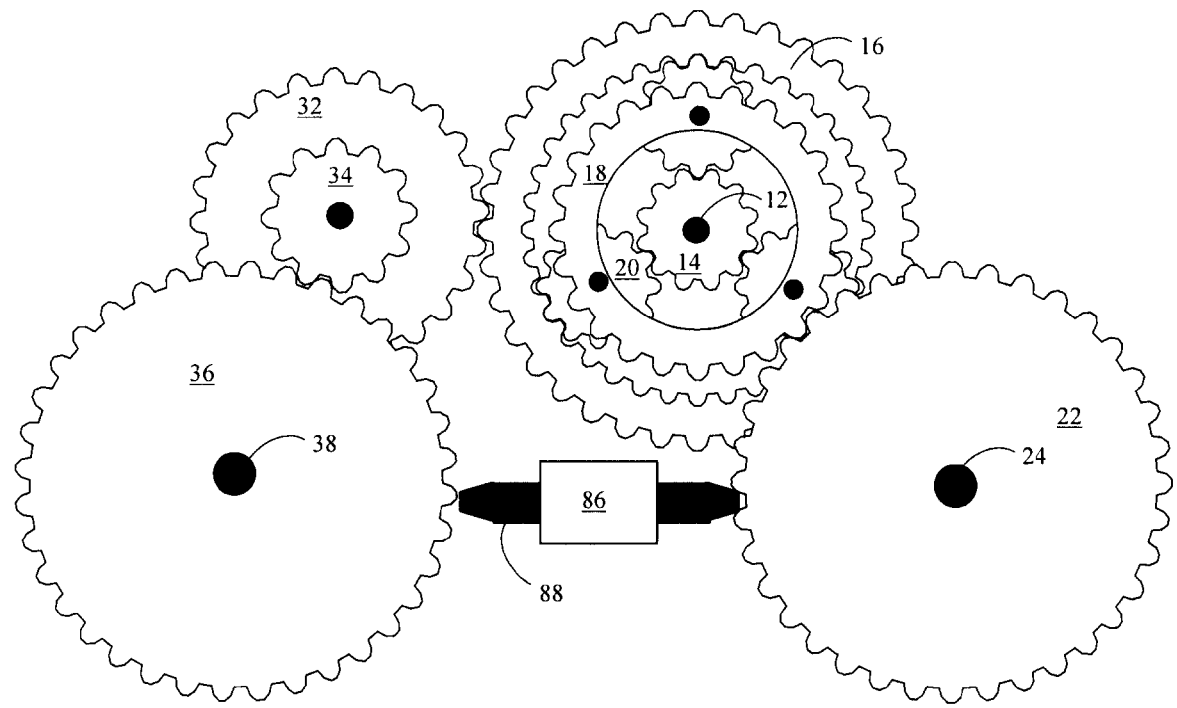
FIG. 5 is an end view of a second embodiment of the gear actuation mechanism.

In a second embodiment, which is depicted in FIG. 5, the selection of which element to hold stationary is determined by an independent control signal. In response to this independent control signal, solenoid 86 moves pin 88 left or right. When pin 88 is moved to the right, as depicted, gear 22 in held stationary and motor 10 is used to move drum 40. When pin 88 is moved to the left, gear 36 is held stationary and motor 10 is used to move drum 26. Alternatively, the control signal could be hydraulic as opposed to electrical in which case pin 88 would be driven by a piston.

What is claimed is:

1. A gear actuation mechanism for a multiple speed automatic transmission, comprising:
    a motor;
    first and second gear actuation shafts;
    means of engaging and releasing couplers within the transmission in response to rotation of the first and second gear actuation shafts; and
    a configurable mechanism driveably connecting the motor alternately to the first gear actuation shaft or the second gear actuation shaft, the configurable mechanism comprising
    a sun gear;
    a ring gear;
    a planet carrier; and
    a set of planet gears supported for rotation with respect to the planet carrier and each meshing with both the sun gear and the ring gear.

2. A dual clutch automatic transmission comprising:
    first and second clutches;

a first set of selectable power paths, each including the first clutch;
  a second set of selectable power paths, each including the second clutch;
  a motor;
  first and second gear actuation shafts;
  a means of engaging the couplers of one power path from the first set of power paths in response to rotation of the first gear actuation shaft;
  a means of engaging the couplers of one power path from the second set of power paths in response to rotation of the second gear actuation shaft;
  a configurable mechanism driveably connecting the motor alternately to the first gear actuation shaft or the second gear actuation shaft, the configurable mechanism comprising an epicyclic gearing assembly with a first element driveably connected to the first gear actuation shaft a second element driveably connected to the second ear actuation shaft, and a third element driveably connected to the motor, and wherein the speed of one of the three elements is constrained to be the weighted average of the speeds of the other two elements; and
  a means of holding one of the two gear actuation shafts stationary in response to a control signal.

3. A dual clutch automatic transmission comprising:
  first and second clutches;
  a first set of selectable power paths, each including the first clutch;
  a second set of selectable power paths, each including the second clutch;
  a motor;
  first and second gear actuation shafts;
  a means of engaging the couplers of one power path from the first set of power paths in response to rotation of the first gear actuation shaft;
  a means of engaging the couplers of one power path from the second set of power paths in response to rotation of the second actuation shaft;
  a configurable mechanism driveably connecting the motor alternately to the first gear actuation shaft or the second gear actuation shaft, the configurable mechanism comprising an epicyclic gearing assembly with a first element driveably connected to the first gear actuation shaft, a second element driveably connected to the second gear actuation shaft, and a third element driveably connected to the motor, and wherein the speed of one of the three elements is constrained to be the weighted average of the speeds of the other two elements; and wherein
  the first gear actuation shaft is held stationary whenever the first clutch is partially or fully engaged; and
  the second gear actuation shaft is held stationary whenever the second clutch is partially or fully engaged.

* * * * *